United States Patent
Miyake et al.

(10) Patent No.: US 11,982,349 B2
(45) Date of Patent: May 14, 2024

(54) CONTROL SYSTEM, CONTROL DEVICE, CONTROL METHOD, AND NON-TRANSITORY STORAGE MEDIUM

(71) Applicant: TOYOTA JIDOSHA KABUSHIKI KAISHA, Toyota (JP)

(72) Inventors: Kazuki Miyake, Okazaki (JP); Wataru Kanda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/324,591

(22) Filed: May 26, 2023

(65) Prior Publication Data
US 2023/0392686 A1 Dec. 7, 2023

(30) Foreign Application Priority Data
Jun. 3, 2022 (JP) .................. 2022-090776

(51) Int. Cl.
*F16H 61/04* (2006.01)
*F16H 59/56* (2006.01)

(52) U.S. Cl.
CPC ......... F16H 61/0437 (2013.01); F16H 59/56 (2013.01); *F16H 2061/0481* (2013.01)

(58) Field of Classification Search
CPC .............. F16H 59/56; F16H 61/0437; F16H 2061/0481
See application file for complete search history.

(56) References Cited

U.S. PATENT DOCUMENTS

| | | | | | |
|---|---|---|---|---|---|
| 3,855,875 | A | * | 12/1974 | Hansen | B60W 30/18 192/3.57 |
| 5,265,018 | A | * | 11/1993 | Sokol | F16H 61/702 701/52 |
| 5,373,924 | A | * | 12/1994 | McKee | F16H 61/22 74/483 R |
| 5,992,256 | A | * | 11/1999 | Steeby | F16H 61/702 477/79 |
| 2007/0276549 | A1 | * | 11/2007 | Hijikata | B60W 30/182 701/1 |
| 2020/0070849 | A1 | | 3/2020 | Suzuki et al. | |

FOREIGN PATENT DOCUMENTS

CN 103527761 A 1/2014
JP 2020-032894 A 3/2020

* cited by examiner

*Primary Examiner* — Edwin A Young
(74) *Attorney, Agent, or Firm* — Oliff PLC

(57) ABSTRACT

A control method for a power train system that includes a clutch position sensor, a processor, and a manual transmission includes converting a gear stage selected by a shift lever of the manual transmission to a control shift range of an automatic transmission, sending specific information that enables identification of the converted control shift range to the control device configured to control motion of a vehicle in cooperation with the power train system, and holding, when operation of a clutch is detected by the clutch position sensor configured to detect operation of the clutch, specific information that enables identification of the control shift range at a time at which operation of the clutch is started, as the specific information to be sent to the control device.

7 Claims, 5 Drawing Sheets

CONTROL SYSTEM, CONTROL DEVICE, CONTROL METHOD, AND NON-TRANSITORY STORAGE MEDIUM

CROSS-REFERENCE TO RELATED APPLICATION

This application claims priority to Japanese Patent Application No. 2022-090776 filed on Jun. 3, 2022, incorporated herein by reference in its entirety.

BACKGROUND

1. Technical Field

The present disclosure relates to a control system, a control device, a control method, and a non-transitory storage medium, and, in particular, to a control system that includes a power train system including a control device that controls motion 15 of the vehicle, and a manual transmission, the control device thereof, the control method in the power train system thereof, and the non-transitory storage medium executed by the power train system thereof.

2. Description of Related Art

A motion manager that manages motion of a vehicle is known (see, for 20 example, Japanese Unexamined Patent Application Publication No. 2020-032894). In a system that includes the motion manager, the motion manager acquires information (for example, information indicating whether the vehicle is in drive, reverse, or neutral) on a shift range being controlled from a control unit of a power train system.

SUMMARY

When the control unit of this power train system is used in to a power train system that includes a manual transmission instead of an automatic transmission, the following may be considered. For example, when a shift lever is in a shift position of a gear stage, such as a second or a third gear, information indicating that the shift range is a drive range is output to the motion manager as a control shift range. For example, when the shift lever is in a shift position of an R gear stage, information indicating that the shift range is a reverse range is output to the motion manager as the control shift range. For example, when the shift lever is in a neutral position, information indicating that the shift range is a neutral range is output to the motion manager as the control shift range.

In such a case, when the driver changes the gear stage from the second to the third, the shift lever passes through the neutral position. Thus, information indicating that the shift range is the drive range, then the neutral range, and then the drive range is sequentially output to the motion manager as the control shift range. The motion manager sets a braking force corresponding to the shift range. For this reason, when the shift range is switched in the order of the drive range, the neutral range, and the drive range, the braking force fluctuates, and thus the vehicle cannot be smoothly accelerated and decelerated due to the fluctuations in the acceleration of the vehicle.

The present disclosure provides a control system, a control device, a control method, and a non-transitory storage medium that can smoothly accelerate and decelerate the vehicle.

A control system according to a first aspect of the present disclosure includes a control device configured to control motion of a vehicle, and a power train system including a manual transmission. The power train system includes a clutch position sensor configured to detect operation of a clutch, and a processor configured to control the power train system. The processor is configured to convert a gear stage selected by a shift lever of the manual transmission to a control shift range of an automatic transmission. The processor is configured to send, to the control device, specific information that enables identification of the converted control shift range. The processor is configured to hold, when operation of the clutch is detected by the clutch position sensor, specific information that enables identification of the control shift range at a time at which operation of the clutch is started, as the specific information to be sent to the control device.

With such a configuration, when the clutch is being operated, the specific information that enables the identification of the control shift range where the gear stage is converted at a time at which the operation is started is held and sent to the control device. For this reason, even when the shift lever passes through the neutral position at a time at which the gear stage is switched by the shift lever, the specific information that enables the identification of the control shift range where the gear stage is converted before switching is sent to the control device. Thus, it is possible to prevent the braking force set by the control device from fluctuating. As a result, it is possible to provide the control system that can smoothly accelerate and decelerate the vehicle.

In the first aspect, the control system may be a vehicle.

In the first aspect, the power train system may further include a neutral position sensor configured to detect that the shift lever is in a neutral position. When the clutch position sensor detects operation of the clutch and the neutral position sensor detects that the shift lever is in the neutral position, the processor may be configured not to send specific information that enables the identification of the neutral position as the specific information to be sent to the control device.

For this reason, even when the shift lever passes through the neutral position at a time at which the gear stage is switched by the shift lever, the specific information that enables the identification of the neutral position is not sent to the control device. Thus, it is possible to prevent the braking force set by the control device from fluctuating. As a result, it is possible to smoothly accelerate and decelerate the vehicle.

In the first aspect, when the clutch position sensor detects operation of the clutch and the neutral position sensor detects that the shift level is in the neutral position, the processor may be configured to send the held specific information to the control device.

With such a configuration, even when the shift lever passes through the neutral position at the time at which the gear stage is switched by the shift lever, the specific information that enables the identification of the control shift range in which the gear stage is converted before switching is sent to the control device. Thus, it is possible to prevent the braking force set by the control device from fluctuating. As a result, it is possible to smoothly accelerate and decelerate the vehicle.

A control device according to a second aspect of the present disclosure is configured to control motion of a vehicle in cooperation with a power train system. The processor is configured to execute processing according to specific information that is received from the power train system and that enables identification of a control shift range, and receive, from the power train system, the specific information that enables identification of the control shift range of an automatic transmission at a time at which the operation of the clutch is started, when the power train system includes a manual transmission, detects operation of the clutch, and detects that a shift lever of the manual transmission is in a neutral position. The control shift range is converted from a gear stage selected by the shift lever.

With such a configuration, it is possible to provide the control device that can smoothly accelerate and decelerate the vehicle.

A control method according to a third aspect of the present disclosure is a control method in a power train system that includes a manual transmission. The control method includes converting, by the processor configured to control the power train system, a gear stage selected by a shift lever of the manual transmission to a control shift range of an automatic transmission, and sending, by the processor, specific information that enables identification of the converted control shift range to the control device configured to control motion of a vehicle in cooperation with the power train system. The control method includes holding, when operation of a clutch is detected by the clutch position sensor configured to detect operation of the clutch, specific information that enables identification of the control shift range at a time at which operation of the clutch is started, as the specific information to be sent to the control device.

With such a configuration, it is possible to provide the control method that can smoothly accelerate and decelerate the vehicle.

A non-transitory storage medium according to a fourth aspect of the present disclosure stores instructions that are executable by one or more processors in the power train system and that cause the one or more processors to execute the control method of the third aspect.

With such a configuration, it is possible to provide the non-transitory storage medium that can smoothly accelerate and decelerate a vehicle.

With such a configuration, it is possible to provide a vehicle that can smoothly accelerate and decelerate the vehicle.

With each aspect of the present disclosure, it is possible to provide a control system, a control device, a control method, and a non-transitory storage medium that can smoothly accelerate and decelerate a vehicle.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

Hereinafter, embodiments of the present disclosure will be described with reference to drawings. In the description below, same signs will denote same parts. Their names and functions will be the same, and detailed description thereof will not be repeated.

Figure 1:
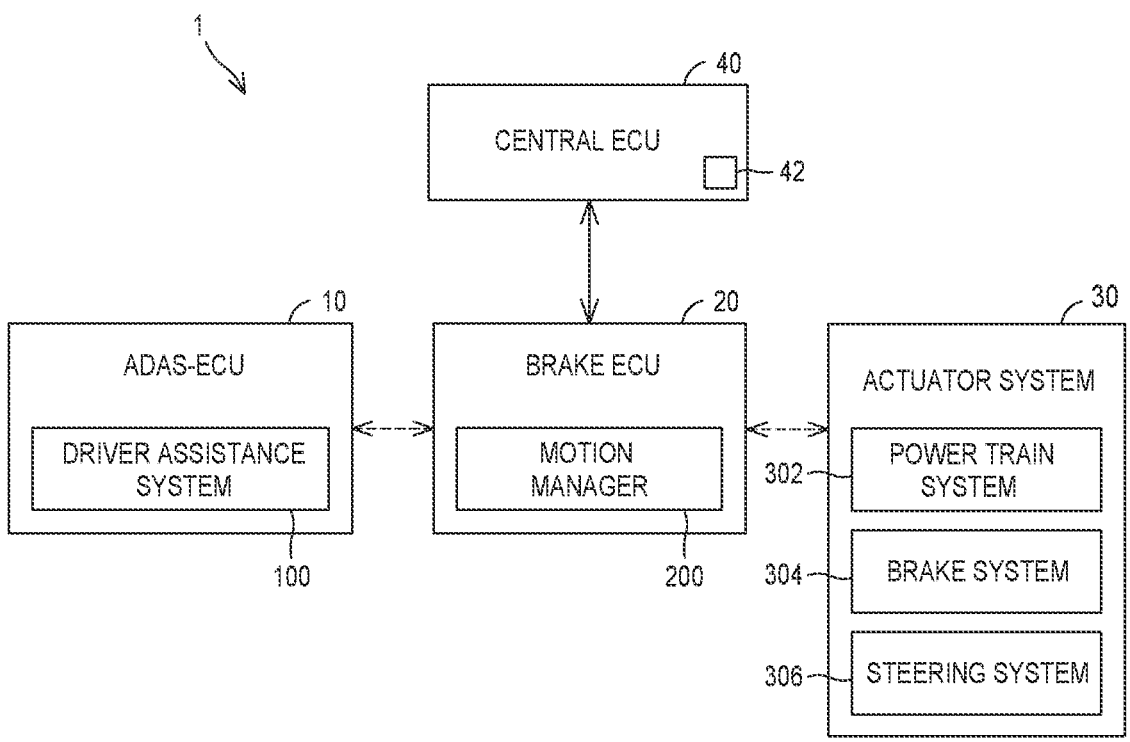
FIG. 1 is a diagram illustrating an example of a configuration of a vehicle.

FIG. 1 is a diagram illustrating an example of a configuration of a vehicle 1. As illustrated in FIG. 1, the vehicle 1 includes an ADAS-electronic control unit (ECU) a brake ECU 20, an actuator system 30, and a central ECU 40.

The vehicle 1 may be a vehicle having a configuration capable of realizing a function of a driver assistance system described below, and may be, for example, a vehicle having an engine as a driving source, a battery electric vehicle having an electric motor as a driving source, or a hybrid electric vehicle having an engine and an electric motor mounted thereon and using at least one of them as a driving source.

The ADAS-ECU 10, the brake ECU 20, and the central ECU 40 are computers and each has a processor that executes a program, such as a central processing unit (CPU), a memory, and an input/output interface.

The ADAS-ECU 10 includes a driver assistance system 100 having a function of driver assistance for assisting driving of the vehicle 1. The driver assistance system 100 is configured to realize various functions for assisting driving of the vehicle 1 including at least one of a steering control, a driving control, and a braking control of the vehicle 1 by executing applications mounted on the driver assistance system 100. Examples of the applications mounted on the driver assistance system 100 include an application that realizes a function of an autonomous driving system (AD), an application that realizes a function of an autonomous parking system, or an application (hereinafter, referred to as an ADAS application) that realizes a function of an advanced driver assistance system (ADAS), and the like.

Examples of the ADAS application include at least one of an application that realizes a function of follow-up traveling (an adaptive cruise control (ACC), or the like) that travels while constantly keeping a distance with a preceding vehicle, an application that realizes a function of an auto speed limiter (ASL) that recognizes a vehicle velocity limit and maintains an upper limit of velocity of a subject vehicle, an application that realizes a function of a lane maintenance assistance (a lane keeping assist (LKA), a lane tracing assist (LTA), or the like) that executes enabling a vehicle to stay in a lane in which the vehicle travels, an application that realizes a function of collision damage mitigation braking (an autonomous emergency braking (AEB), pre-crash safety (PCS), or the like) that executes autonomous braking to mitigate damage caused by a collision, an application that realizes a function of a lane departing warning (a lane departure warning (LDW), and a lane departure alert (LDA), or the like) that warns the vehicle 1 of departure from a lane in which it travels.

Each application of the driver assistance system 100 outputs, to the brake ECU 20 (more specifically, the motion manager 200), a request for a kinematic plan that guarantees a commercial value (a function) of each application based on information of a vehicle surroundings situation acquired (input) from a plurality of sensors (not shown), an assistance request of a driver, or the like. Examples of the plurality of sensors include a vision sensor, such as a forward-looking camera, a radar, Light Detection and Ranging (LiDAR), a position detection device, or the like.

The forward-looking camera is arranged, for example, on the backside of a rear-view mirror in a vehicle cabin and is used for capturing an image of the front of the vehicle. The radar is a distance measuring device that beams radio waves having a short wavelength on an object, detects the radio waves returning from the object, and measures a distance or a direction to the object. The LiDAR is a distance measuring device that beams a laser beam (light, such as infrared rays) in a pulse shape on an object and measures a distance by the time until the laser beam is reflected by the object and returns. The position detection device is composed of, for example, the Global Positioning System (GPS) that detects a position of the vehicle 1 using information received from a plurality of satellites orbiting the earth.

Each application acquires information of the vehicle surroundings situation that integrates detection results of one or more sensors as recognition sensor information, and acquires an assistance request of the driver by way of a user interface (not shown), such as a switch. For example, each application can recognize other vehicles, obstacles, or people in the vicinity of the vehicle by image processing on an image or video in the vicinity of the vehicle acquired by the plurality of sensors, using artificial intelligence (AI) or image processing processor.

Further, the kinematic plan includes, for example, a request for longitudinal acceleration/deceleration generated in the vehicle 1, a request for a steering angle of the vehicle 1, a request for keeping stopping of the vehicle 1, or the like.

Examples of the request for the longitudinal acceleration/deceleration generated in the vehicle 1 include an operation request to a power train system 302 or an operation request to a brake system 304.

Examples of the request for keeping the stopping of the vehicle 1 include requests for permitting and prohibiting operation of at least one of an electric parking brake and a parking lock mechanism (neither shown).

The electric parking brake limits rotation of wheels of the vehicle 1 by, for example, operating an actuator. The electric parking brake may be configured to limit the rotation of the wheels by, for example, operating a brake for a parking brake provided on a part of a plurality of wheels provided on the vehicle 1 using an actuator. Alternatively, the electric parking brake may limit the rotation of the wheels to brake the wheels during the rotation or hold the wheels in a stopped state by adjusting hydraulic pressure (hereinafter, sometimes referred to as brake hydraulic pressure) supplied to the brake device of the brake system 304 by operating an actuator for the parking brake.

The parking lock mechanism limits rotation of an output shaft of a transmission by operating an actuator. The parking lock mechanism fits, for example, a protrusion portion provided at a tip of a parking lock pole, a position of which is adjusted by an actuator into a tooth portion of a gear (a lock gear) provided so as to be connected to a rotating element in the transmission of the vehicle 1. In this manner, the rotation of the output shaft of the transmission is limited and the rotation of driving wheels is limited.

The application mounted on the driver assistance system 100 is not particularly limited to the above-described applications. An application that realizes other functions may be added or an existing application may be omitted, and, in particular, the number of the mounted applications is not limited.

Further, in the present embodiment, a case where the ADAS-ECU 10 includes the driver assistance system 100 composed of a plurality of applications is described, but for example, an ECU may be provided for each application. For example, the driver assistance system 100 may be composed of an ECU having an application that realizes a function of an autonomous driving system, an ECU having an application that realizes a function of an autonomous parking system mounted thereon, and an ECU having an ADAS application mounted thereon.

The brake ECU 20 includes a motion manager 200. In the present embodiment, the case where the brake ECU 20 has a hardware configuration including the motion manager 200 is described as an example, but the motion manager 200 may be provided as a single ECU separate from the brake ECU 20 or may be included in another ECU different from the brake ECU 20. The brake ECU 20 is configured to be able to communicate with each of the ADAS-ECU 10, various ECUs included in the actuator system 30, and the central ECU 40.

The motion manager 200 requests, to the actuator system 30, the motion of the vehicle 1 according to the kinematic plan set in at least one of the applications of the driver assistance system 100. Detailed configuration of the motion manager 200 will be described below.

The actuator system 30 is configured to realize the request for the motion of the vehicle 1 output from the motion manager 200. The actuator system 30 includes a plurality of actuators. FIG. 1 illustrates an example where the actuator system 30 includes, for example, a power train system 302, a brake system 304, and a steering system 306 as actuators. The number of actuators that are requesting destinations of the motion manager 200 is not limited to three as described above, but may be four or more, or may be two or less.

The power train system 302 includes a power train capable of generating a driving force on the drive wheels of the vehicle 1 and an ECU (neither shown) that controls the operation of the power train. The power train includes, for example, at least one of an internal combustion engine, such as a gasoline engine or a diesel engine, a transmission including a gearbox, a differential device, or the like, a motor generator as a driving source, a power accumulation device that accumulates power supplied to the motor generator, a power conversion device that mutually converts power between the motor generator and the power accumulation device, and a power generating source, such as a fuel cell. The ECU that controls the operation of the power train executes a control of a corresponding device so as to realize the request for the motion from the motion manager 200 to the corresponding device in the power train system 302.

The brake system 304 includes, for example, a plurality of brake devices provided on respective wheels of the vehicle 1. The brake devices include, for example, a hydraulic brake, such as a disc brake that generates a braking force or a holding force using hydraulic pressure. As the brake device, for example, a motor generator that is connected to a wheel and that generates regenerative torque, may be further included. A braking operation of the vehicle 1 using the plurality of brake devices is controlled by the brake ECU 20. Separately from the motion manager 200, for example, a processor (not shown) used for controlling the brake system 304 is provided in the brake ECU 20.

The steering system 306 includes, for example, a steering device capable of changing a steering angle of a steering wheel (for example, a front wheel) of the vehicle 1 and an ECU (neither shown) that controls operation of the steering device. The steering device includes, for example, the steering wheel that changes the steering angle according to an operation amount, and an electric power steering (EPS) in which the steering angle can be adjusted by an actuator, separately from the operation of the steering wheel. The ECU that controls the operation of the steering device controls operation of an actuator of the EPS.

The central ECU 40 includes a memory 42 capable of updating stored content. The central ECU 40 is configured to be communicable with, for example, the brake ECU 20, and configured to be communicable with a device (not shown, for example, a server) outside the vehicle 1 by way of a communication module (not shown). When update information is received from a server outside the vehicle 1, the central ECU 40 updates information stored in the memory 42 using the received update information. Predetermined information is stored in the memory 42. The predetermined information includes, for example, information read from various ECUs when the system of the vehicle 1 is started.

In the present embodiment, it is described that the central ECU 40 reads predetermined information from various ECUs when the system of the vehicle 1 is started, but may have a function, such as relaying communication between various ECUs (a gateway function).

Figure 2:
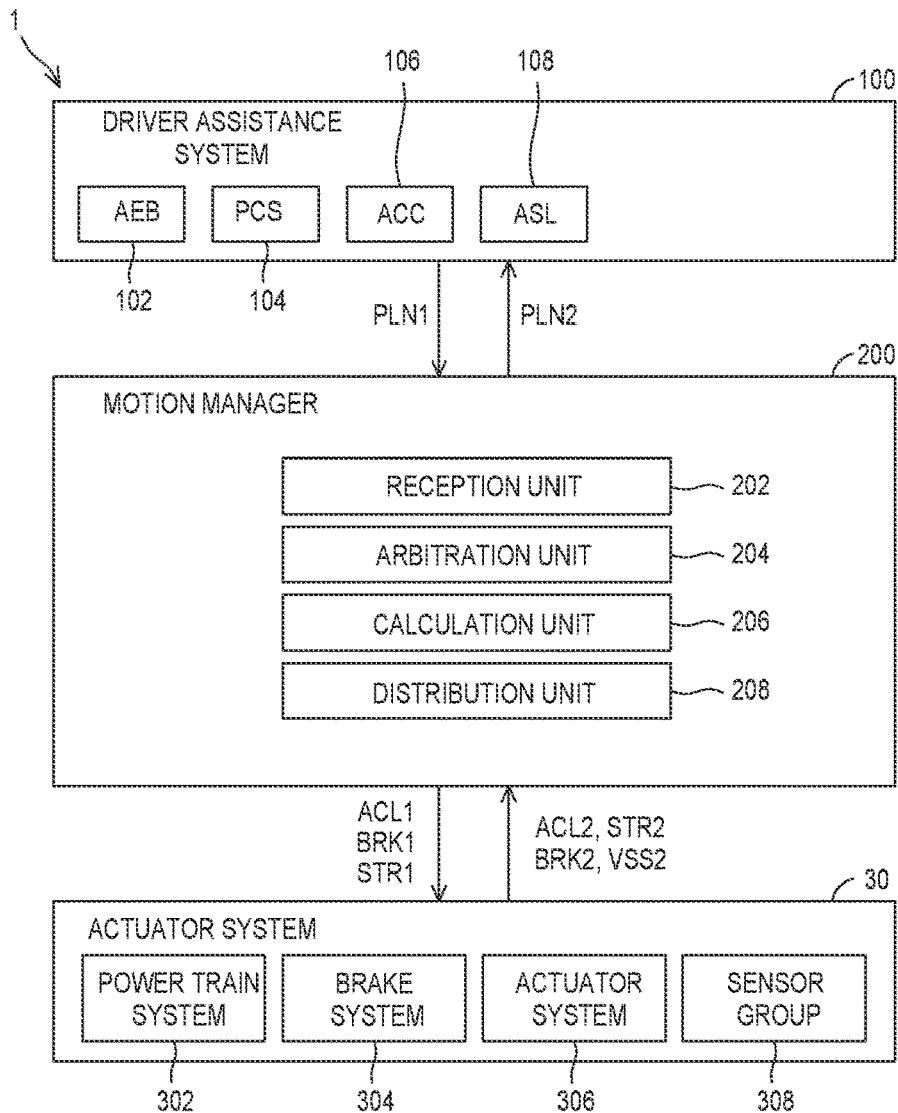
FIG. 2 is a diagram for describing an example of operation of a motion manager.

Hereinafter, an example of operation of the motion manager 200 will be described in detail with reference to FIG. 2. FIG. 2 is a diagram used for describing an example of the operation of the motion manager 200.

FIG. 2 illustrates an example where the driver assistance system 100 includes, for example, an AEB 102, a PCS 104, an ACC 106, and an ASL 108 as applications. A request for a kinematic plan set in at least one of a plurality of applications is transmitted from the driver assistance system 100 to the motion manager 200 as a request signal PLN1.

The request signal PLN1 includes, for example, information on a target acceleration set in the ACC 106, the AEB 102, the PCS 104, or the ASL 108 as one of the kinematic plans. The target acceleration includes an acceleration value for keeping the vehicle 1 in the stopped state other than an acceleration value for driving or braking the vehicle 1.

The motion manager 200 sets the motion requested to the vehicle 1 based on the request for the kinematic plans included in the received request signal PLN1, and requests the actuator system 30 to realize the set motion. In other words, the motion manager 200 transmits, to the actuator system 30, an operation request to the power train system 302 as a request signal ACL1. The motion manager 200 transmits, to the actuator system 30, an operation request to the brake system 304 as a request signal BRK1. Further, the motion manager 200 transmits, to the actuator system 30, an operation request to the steering system 306 as a request signal STR1.

The request signal ACL1 includes, for example, information on a request value of driving torque or a driving force, or information on a method of arbitration (for example, which to select between a maximum value or a minimum value or whether to change a value stepwise or gradually).

The request signal BRK1 includes, for example, information on a request value of braking torque, information on a method of arbitration (for example, whether to change a value stepwise, gradually, or the like), or information on execution timing of braking (whether to immediately execute, or the like).

The request signal STR1 includes, for example, information on a target steering angle, information on whether the target steering angle is effective, or information on upper and lower limit torques of an assistance torque of operation of the steering wheel.

The actuator that has received a corresponding request signal from among the plurality of actuators composing the actuator system 30 is controlled such that an operation request included in the request signal is realized.

Hereinafter, an example of a configuration of the motion manager 200 will be described. As illustrated in FIG. 2, the motion manager 200 includes a reception unit 202, an arbitration unit 204, a calculation unit 206, and a distribution unit 208.

The reception unit 202 receives a request for the kinematic plans output by one or more applications of the driver assistance system 100. Details of the kinematic plan in the present embodiment will be described below.

The arbitration unit 204 arbitrates the request for the kinematic plans received from the respective applications via the reception unit 202. An example of this arbitration processing can be selecting one kinematic plan from among the kinematic plans based on a predetermined selection criterion. Alternatively, another example of the arbitration processing can be setting a new kinematic plan based on the kinematic plans. The arbitration unit 204 may further add predetermined information received from the actuator system 30 and arbitrate the request for the kinematic plans. Further, the arbitration unit 204 may determine whether to temporarily prioritize the motion of the vehicle 1 that is required according to a driver state and a vehicle state over the motion of the vehicle 1 that corresponds to the kinematic plan determined based on an arbitration result.

The calculation unit 206 calculates motion requests based on the arbitration result of the request for the kinematic plans in the arbitration unit 204 and the motion of the vehicle 1 that is determined based on the arbitration result. The motion includes a physical amount that is used for controlling at least one actuator of the actuator system 30, and that is different from a physical amount of the request for the kinematic plans. For example, when the request for the kinematic plans (a first request) is a longitudinal acceleration value, the calculation unit 206 calculates a value obtained by converting the acceleration into the driving force or the driving torque to be the motion request (a second request). For example, when the target acceleration for keeping the stopped state is selected as the arbitration result, the calculation unit 206 calculates the required driving force corresponding to the target acceleration.

The distribution unit 208 executes a distribution process for distributing the motion requests calculated by the calculation unit 206 to at least one actuator of the actuator system 30. When, for example, the acceleration of vehicle 1 is requested, the distribution unit 208 distributes the motion requests only to the power train system 302. Alternatively, when deceleration of the vehicle 1 is requested, the distribution unit 208 appropriately distributes the motion requests to the power train system 302 and the brake system 304 in order to realize a target deceleration.

For example, when the target acceleration for keeping the stopped state is selected as the arbitration result, the distribution unit 208 determines a holding force (for example, the brake hydraulic pressure) corresponding to the calculated driving force. In this case, the distribution unit 208 outputs the determined holding force to the brake system 304 as a motion request.

Information on a state of the power train system 302 is transmitted from the power train system 302 of the actuator system 30 to the motion manager 200 as a signal ACL2. Examples of the information on the state of the power train system 302 include information on operation of an accelerator pedal, information on an actual driving torque or an actual driving force of the power train system 302, actual shift range information, information on upper and lower limits of the driving torque, information on upper and lower limits of the driving force, or information on reliability of the power train system 302.

Information on a state of the brake system 304 is transmitted from the brake system 304 of the actuator system 30 to the motion manager 200 as a signal BRK2. Examples of the information on the state of the brake system 304 include information on operation of the brake pedal, information on a braking torque requested by the driver, information on a request value of the braking torque after arbitration, information on the actual braking torque after arbitration, information on the holding force after the arbitration, or information on reliability of the brake system 304.

Information on a state of the steering system 306 is transmitted from the steering system 306 of the actuator system 30 to the motion manager 200 as a signal STR2. Examples of the information on the state of the steering system 306 include information on reliability of the steering system 306, information on whether the driver grips the steering wheel, information on torque for operating the steering wheel, or information on a rotation angle of the steering wheel.

Further, the actuator system 30 includes a sensor group 308, in addition to the power train system 302, the brake system 304, and the steering system 306 that are described above.

The sensor group 308 includes a plurality of sensors that detect behavior of the vehicle 1. The sensor group 308 includes, for example, a longitudinal G sensor that detects a vehicle body acceleration in the longitudinal direction of the vehicle 1, a lateral G sensor that detects the vehicle body acceleration in the lateral direction of the vehicle 1, a wheel velocity sensor that is provided on each wheel and that detects a wheel velocity, and a yaw rate sensor that detects an angular velocity of the rotation angle (a yaw angle) in the yaw direction of the vehicle 1. The sensor group 308 transmits information including detection results of the plurality of sensors to the motion manager 200 as a signal VSS2. In other words, the signal VSS2 includes, for example, a detection value of the longitudinal G sensor, a detection value of the lateral G sensor, a detection value of the wheel velocity sensor of each wheel, a detection value of the yaw rate sensor, and information on reliability of each sensor.

Upon receiving various signals received from the actuator system 30, the motion manager 200 transmits predetermined information as a signal PLN2 to the driver assistance system 100.

The configuration of the device mounted on the vehicle 1 and the configuration of the motion manager 200 that are described above are examples, and can be added, replaced, changed, omitted, or the like as appropriate. Further, a function of each device can be appropriately executed by an integrated device or a plurality of devices.

In the vehicle 1 having such a configuration, the motion manager 200 acquires information (for example, information indicating whether the vehicle is in drive, reverse, or neutral) on a shift range being controlled from a processor of the power train system 302.

When the processor of this power train system 302 is used in to a power train system that includes a manual transmission instead of an automatic transmission, the following may be considered. For example, when a shift lever is in a gear stage shift position, such as a second or a third gear, information indicating that the shift range is a drive range is output to the motion manager as a control shift range. When the shift lever is in an R gear stage shift position, information indicating that the shift range is a reverse range is output to the motion manager as the control shift range. When the shift lever is in a neutral position, information indicating that the shift range is a neutral range is output to the motion manager as the control shift range.

In such a case, when the driver changes the gear stage from the second to the third, the shift lever passes through the neutral position. Thus, information indicating that the shift range is the drive range, the neutral range, and the drive range is sequentially output to the motion manager 200 as the control shift range. The motion manager 200 sets a braking force corresponding to the shift range. For this reason, when the shift range is switched in the order of the drive range, the neutral range, and the drive range, the braking force fluctuates, and thus the vehicle 1 cannot be smoothly accelerated and decelerated due to the fluctuations in the acceleration of the vehicle 1.

Therefore, the processor of the power train system 302 converts the gear stage selected by the shift lever of the manual transmission to the control shift range of the automatic transmission, sends the specific information that enables the identification of the converted control shift range to the motion manager 200, and holds, as specific information to be sent to the motion manager 200, the specific information that enables the identification of the control shift range at a time at which the operation of the clutch is started when the operation of the clutch is detected by the clutch position sensor.

As such, when the clutch is being operated, the specific information that enables the identification of the control shift range where the gear stage is converted at the time at which the operation is started is held and sent to the motion manager 200. For this reason, even when the shift lever passes through the neutral position at the time at which the gear stage is switched by the shift lever, the specific information that enables the identification of the control shift range where the gear stage is converted before switching is sent to the motion manager 200. Thus, it is possible to prevent the braking force set by the motion manager 200 from fluctuating. As a result, it is possible to smoothly accelerate and decelerate the vehicle 1.

Figure 3:
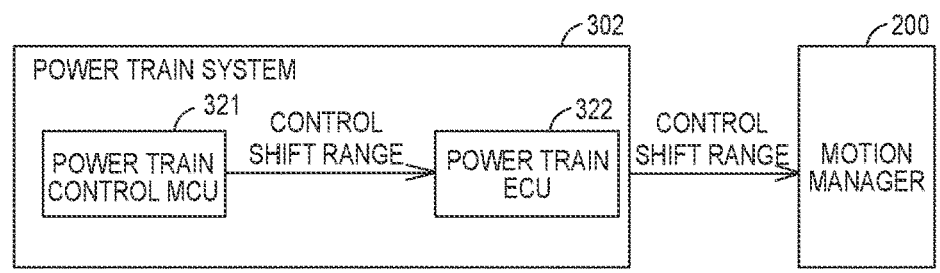
FIG. 3 is a diagram illustrating a block diagram when a power train system of this embodiment includes an automatic transmission.

FIG. 3 is a diagram illustrating a block diagram when the power train system 302 of this embodiment includes the automatic transmission. With reference to FIG. 3, the power train system 302 includes a power train control micro controller unit (MCU) 321 that controls the operation of the automatic transmission and acquires signals from various sensors attached to the automatic transmission, and a power train ECU 322 that controls the entire power train system 302 in cooperation with the power train control MCU 321.

When the power train system 302 includes the automatic transmission, the power train control MCU 321 sends a control shift range signal indicating to which shift range the automatic transmission is controlled to the power train ECU 322.

The power train ECU 322 sends control shift range information indicating the shift range indicated by the control shift range signal received from the power train control MCU 321 to the motion manager 200 via a vehicle network. The motion manager 200 sends control signals according to the shift range indicated by the received control shift range information to the actuator system 30 (for example, the power train system 302 and the brake system 304).

As such, although the power train ECU 322 has originally been designed for the automatic transmission, it is conceivable that it may also be used for the manual transmission.

Figure 4:
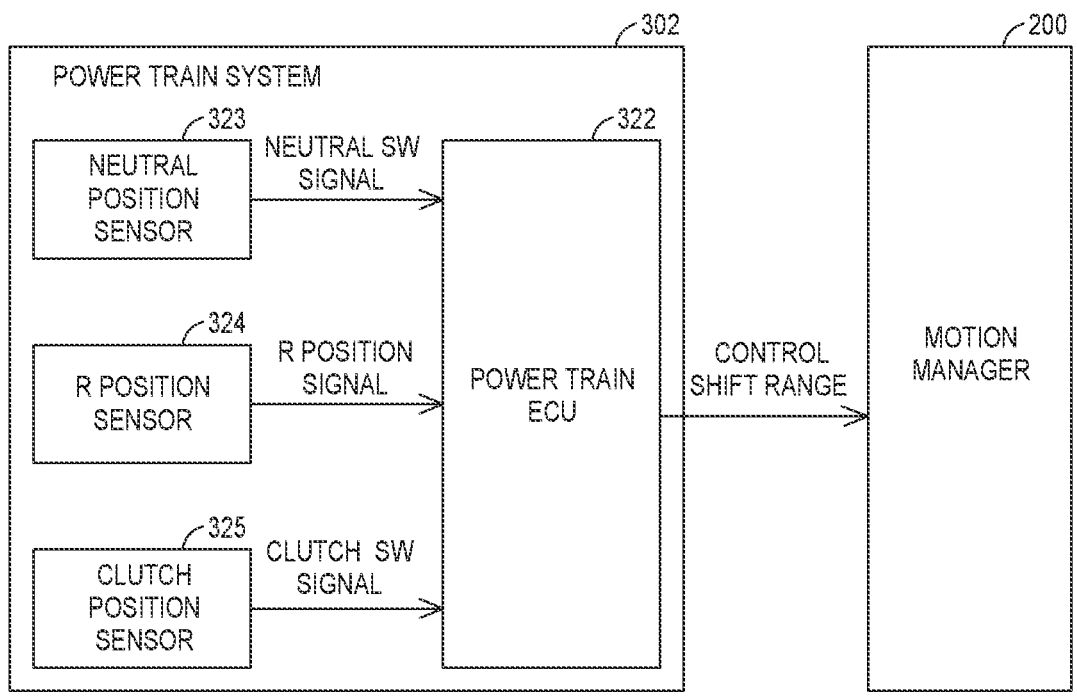
FIG. 4 is a diagram illustrating a block diagram when the power train system of this embodiment includes a manual transmission.

FIG. 4 is a diagram illustrating a block diagram when the power train system 302 of this embodiment includes the manual transmission. With reference to FIG. 4, the power train system 302 includes, in addition to the power train ECU 322, a neutral position sensor 323 that detects that the shift level is in the neutral position, a reverse (R) position sensor 324 that detects the shift lever being positioned in a shift position in which the shift lever is in the R gear stage, and a clutch position sensor 325 that detects whether the clutch pedal is being operated.

The power train ECU 322 receives a neutral SW signal from the neutral position sensor 323, an R position signal from the R position sensor 324, and a clutch SW signal from the clutch position sensor 325, and sends the control shift range information according to these signals to the motion manager 200.

Figure 5:
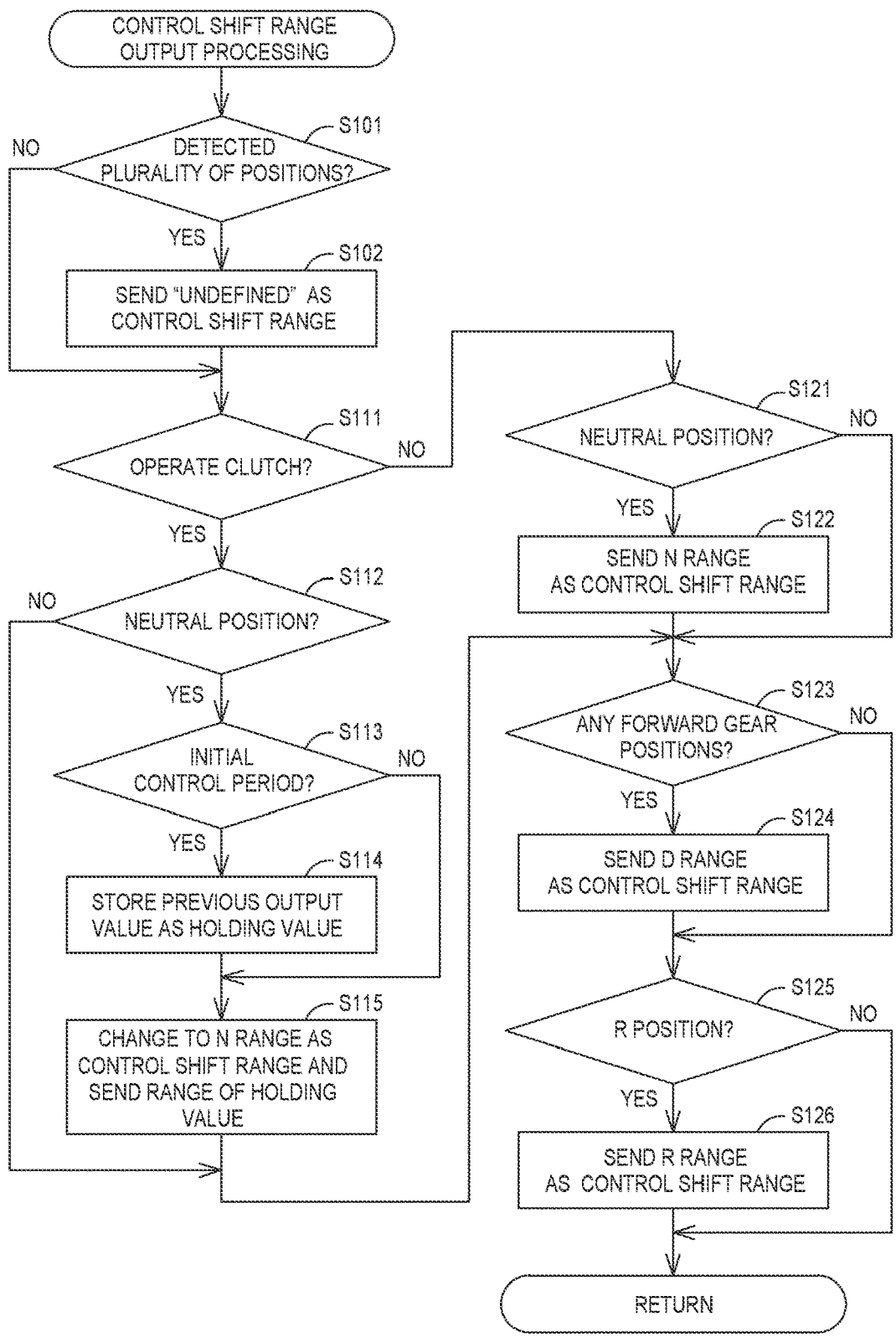
FIG. 5 is a flowchart illustrating a flow of control shift range output processing executed by a power train ECU of this embodiment.

FIG. 5 is a flowchart illustrating a flow of control shift range output processing executed by the power train ECU 322 of this embodiment. With reference to FIG. 5, this control shift range output processing is called and executed by a CPU of the power train ECU 322 from a higher level process every predetermined control cycle.

First, the CPU of the power train ECU 322 determines whether a signal indicating detection of the shift lever being positioned in any of a plurality of positions of the neutral position, any forward gear position, and a reverse gear R position (positions indicated by R of FIG. 6) has been received (step S101).

Figure 6:
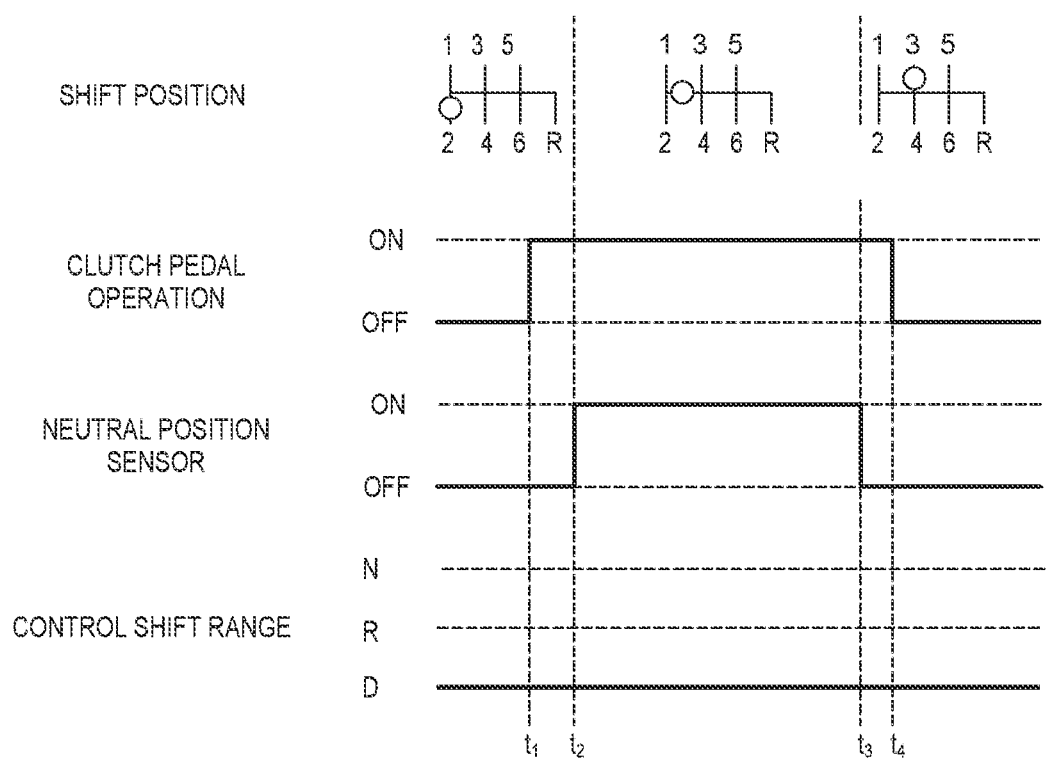
FIG. 6 is a diagram illustrating an example of a timing chart for changing gear stages according to a clutch operation in this embodiment.

FIG. 6 is a diagram illustrating an example of a timing chart in changing gear stages according to a clutch operation in this embodiment. With reference to FIG. 6, the neutral position is a position other than first to sixth forward gear shift positions and the reverse gear shift position (R position). For example, this is the shift position shown in the middle diagram of the diagrams showing the three shift positions illustrated in FIG. 6.

Of the diagrams showing three shift positions illustrated in FIG. 6, the shift position shown in the diagram on the left is the shift position for the second forward gear, and the shift position shown in the diagram on the right is the shift position for the third forward gear.

When it is determined that a signal indicating that the shift lever being positioned in any of a plurality of positions is detected is received (YES in step S101), the CPU of the power train ECU 322 sends the control shift range information indicating "undefined" to the motion manager 200 (step S102).

When it is determined that a signal indicating that the shift lever being positioned in any of the positions is not received (NO in step S101) or after step S102, the CPU of the power train ECU 322 determines whether the clutch is being operated (step S111) using the clutch SW signal from the clutch position sensor 325. When the clutch SW signal indicates that the clutch pedal is being operated, it is determined that the clutch is being operated.

When it is determined that the clutch is being operated (YES in step S111), the CPU of the power train ECU 322 determines whether the shift lever is in the neutral position (step S112) using the neutral SW signal from the neutral position sensor 323. When the neutral SW signal indicates that the shift lever is in the neutral position, it is determined that the shift lever is in the neutral position.

When it is determined that the shift lever is in the neutral position (YES in step S112), the CPU of the power train ECU 322 determines that the clutch is being operated, and determines whether it is a first control cycle after it is determined that the shift lever is in the neutral position (step S113). When it is determined that it is the first control cycle (YES in step S113), an output value of the control shift range indicated by the previous control shift range information sent to the motion manager 200 is stored in a memory of the power train ECU 322 as a holding value (step S114).

When it is determined that it is not the first control cycle (NO in step S113) or after step S114, the CPU of the power train ECU 322 changes to the N (neutral) range as the control shift range, and sends the control shift range information, which is stored in the memory and indicates the range of the holding value, to the motion manager 200 (step S115).

When it is determined that the clutch is not being operated (NO in step S111), the CPU of the power train ECU 322 determines whether the shift lever is in the neutral position (step S112) using the neutral SW signal from the neutral position sensor 323.

When it is determined that the shift lever is positioned in the neutral position (YES in step S121), the CPU of the power train ECU 322 sends the control shift range information indicating the N range as the control shift range to the motion manager 200 (step S122).

When it is determined that the shift lever is not in the neutral position (NO in step S112 or step S121) or after step S115 or step S122, the CPU of the power train ECU 322 determines whether the shift lever is positioned in any of the forward gears (step S123).

When it is determined that the shift lever is positioned in any of the forward gear shift positions (YES in step S123), the CPU of the power train ECU 322 sends the control shift range information indicating the D range as the control shift range to the motion manager 200 (step S124).

When it is determined that the shift lever is not in any of the forward gear shift positions (NO in step S123) or after step S124, the CPU of the power train ECU 322 determines whether the shift lever is positioned in the R position (the position indicated by "R" of FIG. 6) of the rear gear (step S125).

When it is determined that the shift lever is positioned in the R position (YES in step S125), the CPU of the power train ECU 322 sends the control shift range information indicating the R range as the control shift range to the motion manager 200 (step S126).

When it is determined that the shift lever is not in the R position (NO in step S125) or after step S126, the CPU of the power train ECU 322 causes the processing to be executed to return to a higher level process which is a caller of the control shift range output processing.

With reference to FIG. 6 again, this timing chart is a timing chart when the shift lever moves from the second forward gear shift position shown in the left diagram of the diagram showing the three shift positions through the neutral position shown in the middle diagram, and to the third forward gear shift position shown in the right diagram.

Before time t1, the shift position is the second forward gear and the clutch pedal is not being operated. Thus, the determinations in steps S111 and S121 of FIG. 5 are NO, the determination in S123 is YES, and, in step S124, the control shift range information indicating the D range corresponding to the second forward gear as the control shift range is sent to the motion manager 200.

Between time t1 and time t2, the shift position is the second forward gear and the clutch pedal is being operated. Thus, the determination in step S111 is YES, the determination in S112 is NO, the determination in step S123 is YES, and, in step S124, the control shift range information indicating the D range as the control shift range is sent to the motion manager 200.

Between time t2 and time t3, the shift position is the neutral position, and the clutch pedal is being operated. Thus, the determinations in steps S111 and S112 are YES, and, in step S115, the control shift range information indicating the shift range of the holding value is sent to the motion manager 200. Here, after the clutch is operated to the neutral position, in the first control cycle, in step S114, the D range corresponding to the second forward gear, which is the previous output value, is stored as a holding value.

At time t3 and thereafter, the shift position is the third forward gear and the clutch pedal is not being operated. Thus, the determinations in steps S111 and S121 are NO, the determination in S123 is YES, and, in step S124, the control shift range information indicating the D range corresponding to the third forward gear as the control shift range is sent to the motion manager 200.

Modified Examples

In the above-described embodiment, as illustrated in FIG. 3, the power train ECU 322 for the automatic transmission is used. However, the power train ECU is not limited thereto, and a power train ECU for a hybrid electric vehicle (HEV) transmission that continuously changes the drive distribution of an engine and a motor generator by a planetary gear mechanism or the like may be used in, or a power train ECU for a continuously variable transmission (CVT) may be used.

In the above-described embodiment, the control device that controls the motion of the vehicle 1 is used as the motion manager 200 of the brake ECU 20. However, the control device is not limited thereto, and may be another control device, such as a CPU of another ECU.

The above-described embodiment can be regarded as a disclosure of the power train system 302, regarded as a disclosure of the control device, such as the motion manager 200 that controls the motion of the vehicle in cooperation with the power train system 302, regarded as a disclosure of the control system or the vehicle 1 including the control device and the power train system 302, regarded as a disclosure of the control method in the power train system 302, and regarded as a disclosure of the control program executed in the power train system 302.

Summary

As illustrated in FIGS. 1 to 4, the control system includes the motion manager 200 that controls the motion of the vehicle 1 and the power train system 302 that includes the manual transmission. As illustrated in FIG. 4, the power train system 302 includes the clutch position sensor 325 that detects the operation of the clutch, and the power train ECU 322 that controls the power train system 302. As illustrated in FIG. 5, the power train ECU 322 converts the gear stage selected by the shift lever of the manual transmission to the control shift range of the automatic transmission (for example, steps S115, S122, S124, and S126), sends the specific information that enables the identification of the converted control shift range to the motion manager 200 (for example, steps S115, S122, S124, and S126), and holds, as specific information to be sent to the motion manager 200, the specific information that enables the identification of the control shift range at the time at which the operation of the clutch is detected when the operation of the clutch is detected by the clutch position sensor (for example, step S114).

As such, when the clutch is being operated, the specific information that enables the identification of the control shift range where the gear stage is converted at the time at which the operation is started is held and sent to the motion manager 200. For this reason, even when the shift lever passes through the neutral position at the time at which the gear stage is switched by the shift lever, the specific information that enables the identification of the control shift range where the gear stage is converted before switching is sent to the motion manager 200. Thus, it is possible to prevent the braking force set by the motion manager 200 from fluctuating. As a result, it is possible to smoothly accelerate and decelerate the vehicle 1.

As illustrated in FIG. 5, the power train system 302 may further include the neutral position sensor 323 that detects that the shift level is in the neutral position. When the clutch position sensor 325 detects the operation of the clutch and the neutral position sensor 323 detects that the shift level is in the neutral position, the power train ECU 322 does not send the specific information that enables the identification of the neutral position as the specific information to be sent to the motion manager 200 (for example, step S115).

As such, even when the shift lever passes through the neutral position at the time at which the gear stage is switched by the shift lever, the specific information that enables the identification of the neutral position is not sent to the motion manager 200. Thus, it is possible to prevent the braking force set by the motion manager 200 from fluctuating. As a result, it is possible to smoothly accelerate and decelerate the vehicle 1. As illustrated in FIG. 5, when the clutch position sensor 325 detects the operation of the clutch and the neutral position sensor 323 detects that the shift level is in the neutral position, the power train ECU 322 sends the held specific information to the motion manager 200 (for example, step S115).

As such, even when the shift lever passes through the neutral position at the time at which the gear stage is switched by the shift lever, the specific information that enables the identification of the control shift range where the gear stage is converted before switching is sent to the motion manager 200. Thus, it is possible to prevent the braking force set by the motion manager 200 from fluctuating. As a result, it is possible to smoothly accelerate and decelerate the vehicle 1.

The embodiment disclosed herein needs to be considered as illustrative in all points and not restrictive. The scope of the present invention is shown not by the above description of the embodiments but by the claims, and is intended to include meanings equivalent to the claims and all modifications within the scope thereof.

What is claimed is:

1. A control system comprising:
   a control device configured to control motion of a vehicle; and
   a power train system including a manual transmission, wherein
   the power train system includes a clutch position sensor configured to detect operation of a clutch, and a processor configured to control the power train system, and
   the processor is configured to
      convert a gear stage selected by a shift lever of the manual transmission to a control shift range of an automatic transmission,
      send, to the control device, specific information that enables identification of the converted control shift range, and
      hold, when the operation of the clutch is detected by the clutch position sensor, the specific information that enables identification of the control shift range at a time at which the operation of the clutch is started, as the specific information to be sent to the control device.

2. The control system according to claim 1, wherein the control system is the vehicle.

3. The control system according to claim 1, wherein:
the power train system further includes a neutral position sensor configured to detect that the shift lever is in a neutral position; and
the processor is configured not to send the specific information that enables the identification of the neutral position as the specific information to be sent to the control device when the clutch position sensor detects the operation of the clutch and the neutral position sensor detects that the shift lever is in the neutral position.

4. The control system according to claim 3, wherein the processor is configured to send the held specific information to the control device when the clutch position sensor detects the operation of the clutch and the neutral position sensor detects that the shift lever is in the neutral position.

5. A control device configured to control motion of a vehicle in cooperation with a power train system, the control device comprising
a processor configured to:
execute processing according to specific information that is received from the power train system and that enables identification of a control shift range; and
receive, from the power train system, the specific information that enables identification of the control shift range of an automatic transmission at a time at which operation of a clutch is started, when the power train system includes a manual transmission, detects the operation of the clutch, and detects that a shift lever of the manual transmission is in a neutral position, wherein
the control shift range is converted from a gear stage selected by the shift lever.

6. A control method for a power train system that includes a clutch position sensor, a processor, and a manual transmission, the control method comprising:
converting, by the processor configured to control the power train system, a gear stage selected by a shift lever of the manual transmission to a control shift range of an automatic transmission;
sending, by the processor, specific information that enables identification of the converted control shift range to a control device configured to control motion of a vehicle in cooperation with the power train system; and
holding, when operation of a clutch is detected by the clutch position sensor configured to detect operation of the clutch, the specific information that enables identification of the control shift range at a time at which the operation of the clutch is started, as the specific information to be sent to the control device.

7. A non-transitory storage medium storing instructions that are executable by one or more processors in the power train system according to claim 6 and that cause the one or more processors to execute the control method according to claim 6.

* * * * *